US009584644B2

(12) United States Patent
Rhee et al.

(10) Patent No.: US 9,584,644 B2
(45) Date of Patent: Feb. 28, 2017

(54) ELECTRONIC DEVICE AND METHOD FOR HANDLING INCOMING CALL OF THE SAME

(71) Applicant: Samsung Electronics Co., Ltd., Gyeonggi-do (KR)

(72) Inventors: Bongjae Rhee, Gyeonggi-do (KR); Jeehee Lee, Chungcheongbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/487,748

(22) Filed: Sep. 16, 2014

(65) Prior Publication Data
US 2015/0080058 A1   Mar. 19, 2015

(30) Foreign Application Priority Data

Sep. 16, 2013  (KR) .......................... 10-2013-0110962

(51) Int. Cl.
*H04B 1/38* (2015.01)
*H04M 1/725* (2006.01)
*H04M 1/57* (2006.01)
*G06F 3/0488* (2013.01)
(Continued)

(52) U.S. Cl.
CPC ...... *H04M 1/72519* (2013.01); *G06F 3/0488* (2013.01); *G06F 3/04817* (2013.01); *G06F 3/04842* (2013.01); *G06F 3/04886* (2013.01); *H04M 1/57* (2013.01); *H04M 1/72583* (2013.01); *H04M 2250/22* (2013.01)

(58) Field of Classification Search
CPC ........... H04M 1/72597; H04M 1/2477; H04M 7/0033; H04M 3/42374

USPC .......................................................... 455/566
See application file for complete search history.

(56) References Cited

U.S. PATENT DOCUMENTS 6,868,283 B1 * 3/2005 Bonansea ............. G06F 3/0481
  455/550.1
9,008,635 B2 * 4/2015 Tysowski ................ H04M 1/56
  455/415

(Continued)

FOREIGN PATENT DOCUMENTS

EP   1 298 894   4/2003
EP   2 739 021   6/2014
(Continued)

OTHER PUBLICATIONS

European Search Report dated Nov. 18, 2014 issued in counterpart application No. 14183272.5-1972.

*Primary Examiner* — Simon Nguyen
(74) *Attorney, Agent, or Firm* — The Farrell Law Firm, P.C.

(57) ABSTRACT

A method for handling an incoming call of an electronic device and an electronic device using the same is provided. The method includes displaying a user interface for handling the incoming call using a screen boundary of the electronic device, when receiving incoming call information while executing an application program on the electronic device, where the user interface for handling the incoming call using the screen boundary is displayed to overlap the user interface of the executed application program; sensing a touch event on the user interface for handling the incoming call using the screen boundary; and performing an incoming call handling function based on the sensed touch event.

18 Claims, 13 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 2007/0123309 A1* | 5/2007 | Sano | H04M 1/0233 |
| | | | 455/566 |
| 2008/0081569 A1 | 4/2008 | Shiono | |
| 2011/0242268 A1* | 10/2011 | Kim | H04M 7/0063 |
| | | | 348/14.04 |
| 2012/0052920 A1 | 3/2012 | Kobayashi et al. | |
| 2012/0162345 A1* | 6/2012 | Numano | H04M 3/42374 |
| | | | 348/14.01 |
| 2013/0078973 A1 | 3/2013 | Kimura | |
| 2014/0171154 A1* | 6/2014 | Chou | H04M 19/04 |
| | | | 455/566 |

FOREIGN PATENT DOCUMENTS

| | | |
|---|---|---|
| KR | 2005-0006942 | 1/2005 |
| KR | 2005-0081081 | 8/2005 |
| KR | 10-0755748 | 8/2007 |
| KR | 2012-0024449 | 3/2012 |

* cited by examiner

ELECTRONIC DEVICE AND METHOD FOR HANDLING INCOMING CALL OF THE SAME

PRIORITY

This application claims priority under 35 U.S.C. §119(a) to a Korean Patent Application filed on Sep. 16, 2013 in the Korean Intellectual Property Office and assigned Serial No. 10-2013-0110962, the entire invention of which is incorporated herein by reference.

BACKGROUND OF THE INVENTION

1. Field of the Invention

The present invention relates generally to a method for handling an incoming call and an electronic device performing the same.

2. Description of Related Art

In general, an electronic device, such as a Smart Phone, a Tablet PC, a Portable Multimedia Player (PMP), a Personal Digital Assistant (PDA), a laptop Personal Computer (laptop PC) and a wearable device such as a wrist watch, and a Head-Mounted Display (HMD), may include various functions (e.g., a game, a social network service (SNS), Internet, multimedia, a recording and execution of photo and video) as well as a telephone function.

When using an electronic device, a user may place greater priority on functions other than the telephone function, whereas the electronic device places its priority on the phone function. Accordingly, when incoming call occurs during the execution of a function other than the phone function, the electronic device changes to a user interface related to the phone function, thereby decreasing the user's convenience.

SUMMARY

The present invention has been made to address at least the problems and disadvantages described above, and to provide at least the advantages described below.

Accordingly, an aspect of the present invention is to provide a method for handling an incoming call and an electronic device using the same, and to provide a method for arranging a user interface related to the handling of an incoming call.

In accordance with an aspect of the present invention, a method for handling an incoming call of an electronic device is provided. The method includes displaying a user interface for handling the incoming call using a screen boundary of the electronic device, when receiving incoming call information while executing an application program on the electronic device and where the user interface for handling the incoming call using the screen boundary is displayed to overlap the user interface of the executed application program; sensing a touch event on the user interface for handling the incoming call using the screen boundary; and, performing an incoming call handling function based on the sensed touch event.

In accordance with another aspect of the present invention, an electronic device is provided. The electronic device includes a communication unit configured to receive incoming call information; a user input unit configured to sense a touch event; a display unit configured to display an application program and a user interface for handling an incoming call; and, a controller configured to control the display unit to display the user interface for handling the incoming call using a screen boundary of the electronic device, when receiving the incoming call information while executing the application program, and to perform an incoming call handling function based on the sensed touch event, where the user interface for handling the incoming call using the screen boundary is displayed to overlap the user interface of the executed application program.

BRIEF DESCRIPTION OF THE DRAWINGS

The aspects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed descriptions of well-known functions and structures incorporated herein is omitted to avoid obscuring the subject matter of the present invention.

The method for handling an incoming call and the electronic device using the same, according to an embodiment of the present invention, arranges a user interface, related to handling the incoming call, on a boundary of the display screen, thereby minimizing an interruption of an executed application program to increase the user's convenience.

Figure 1:
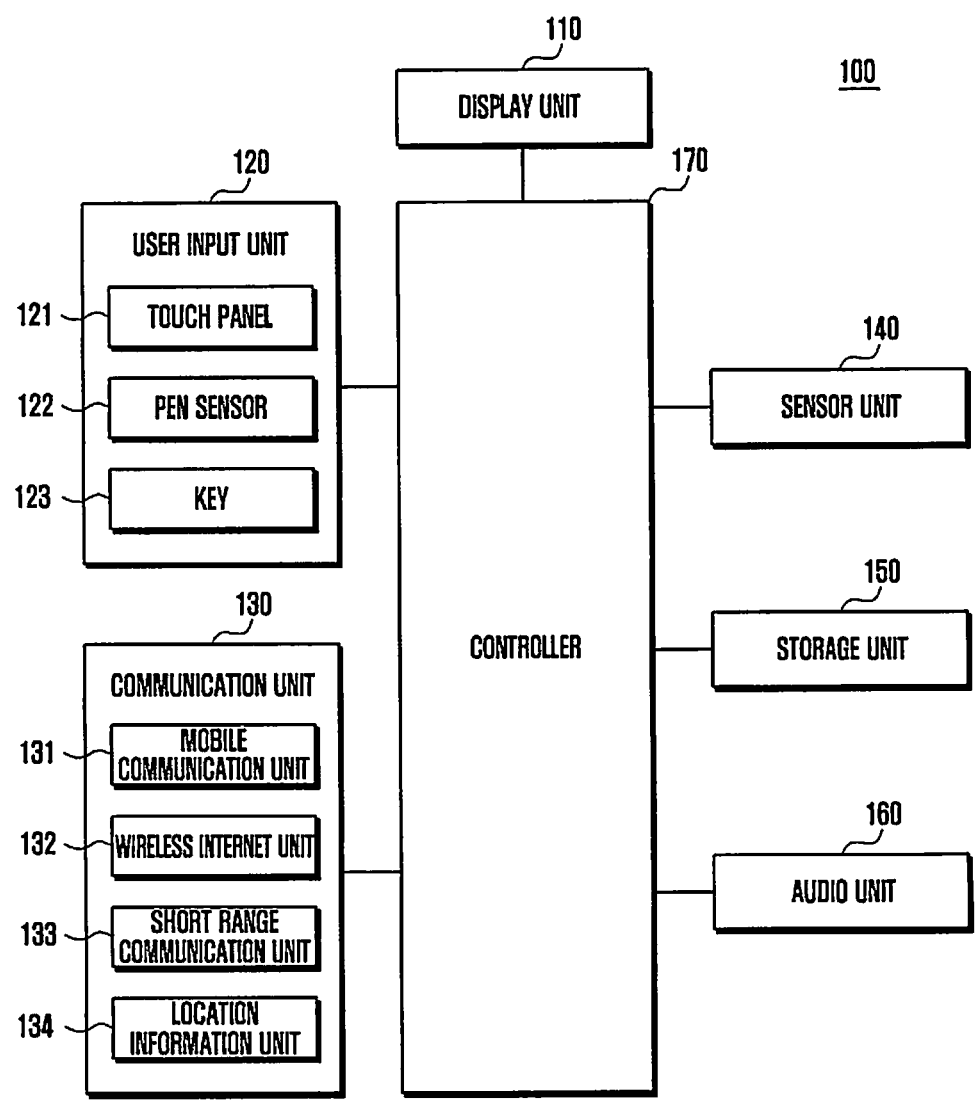
FIG. 1 is a block diagram illustrating a configuration of an electronic device, according to an embodiment of the present invention.

FIG. 1 is a block diagram illustrating a configuration of an electronic device, according to an embodiment of the present invention.

Referring to FIG. 1, the configuration of an electronic device 100 according to an embodiment of the present invention may be applied to a smart phone, but is not limited thereto and may be applied to various other devices. For example, the configuration of the electronic device 100 may also be used to a tablet PC, a Portable Multimedia Player (PMP), a Personal Digital Assistant (PDA), a laptop Personal Computer (laptop PC) and a wearable device such as a wrist watch, and a Head-Mounted Display (HMD).

The electronic device 100 includes a display unit 110, a user input unit 120, communication unit 130, a sensor unit 140, a storage unit 150, an audio unit 160, and a controller 170.

The display unit 110 performs a function of displaying a video or data to a user. The display unit 110 includes a display panel. The display panel may use, for example, a Liquid-Crystal Display (LCD) or an Active-Matrix Organic Light-Emitting Diode (AM-OLED), and the like. The display unit 110 may further include a controller to control the display panel. The display panel may be implemented as a, for example, a flexible, transparent, or wearable type of panel.

The display unit 110 may be combined with a touch panel 121 to be provided in a form of a touch screen. For example, the touch screen may include an integral module in which the display panel and the touch panel are coupled with a laminated structure.

The user input unit 120 receives various instructions from the user. The user input unit 120 may include, for example, at least one of the touch panel 121, a pen sensor 122 or a key 123.

The touch panel 121 recognizes a touch input by a user by at least one of a capacitive type, a resistive type, an infrared type or an ultrasonic type. The touch panel 121 may further include a controller. The capacitive type of touch input may use proximity recognition in addition to a direct touch. The touch panel 121 may further include a tactile layer. In this case, the touch panel 121 may provide an antenna response to the user. The pen sensor 122 is implemented by using a separate sheet for pen recognition in the same manner as a method of receiving a user's touch input. The key 123 may include a mechanical key, a touch key, or the like.

The mechanical key may include at least one of a power button, provided on one side of the electronic device 100, to turn on the display unit when pressed, at least one volume button, located on the other side of the electronic device 100, to control a volume when pressed, and a home button, provided at a center of a lower end of the display unit 110, to switch to a home screen when pressed.

The touch key may include at least one of a menu key, provided on one side of a lower end of the display unit 110, to provide a menu related to content currently being displayed when touched, and a return key, provided on the other side of a lower end of the display unit 110, to provide a function of returning to a previous screen when touched.

According to an embodiment of the present invention, the display unit 110 may display a user interface for handling an incoming call on the whole surface of a screen transmitted from the controller 170 or may display a user interface for handling an incoming call utilizing a screen boundary.

The touch panel 121 senses a touch event by a user interface for handling of an incoming call using the whole surface of a screen or a user interface for handling an incoming call using a screen boundary.

The communication unit 130 includes at least one of a mobile communication unit 131, a wireless internet unit 132, a short range communication unit 133, and a location information unit 134.

The mobile communication unit 131 transmits and receives a wireless signal with at least one of a base station, an external terminal, and a server on a mobile communication network. The wireless signal may include a voice call signal, a video call, or various types of data, according to a transmission and reception of text/multimedia message.

The wireless internet unit 132 performs a function for wireless internet access. A wireless interne technology may use a Wireless LAN (WLAN) (Wi-Fi), a Wireless Broadband (WiBro), a World Interoperability for Microwave Access (WiMax), a High Speed Downlink Packet Access (HSDPA), and the like.

The short range communication unit 133 performs a function for short range communication. Short range communication technology may use Bluetooth, Radio Frequency Identification (RFID), Infrared Data Association (IrDA) communication, Ultra Wideband (UWB), ZigBee, and the like.

The location information unit 134 performs a function of obtaining or identifying a location of the mobile terminal. The location information unit 134 may obtain location information by using a Global Navigation Satellite System (GNSS). Here, the GNSS describes a satellite radio navigational system which revolves around the earth so that given types of radio navigation receivers may send a signal to determine their location on the surface of the earth or near the surface of the earth. The GNSS may include a Global Position System (GPS), Galileo, a Global Orbiting Navigational Satellite System (GLONASS), COMPASS, and a Quasi-Zenith Satellite System (QZSS), and the like.

Additionally, the communication unit 130 may include a network interface (e.g., LAN card) or a modem, and the like to connect the electronic device 100 to a network (e.g., Internet, Local Area Network (LAN), Wire Area Network (WAN), Telecommunication Network, Cellular Network, Satellite Network or Plain Old Telephone Service (POTS)).

According to an embodiment of the present invention, the communication unit 130 transmits a call signal to the control unit 170 when receiving a call signal.

The sensor unit 140 includes a proximity sensor. The sensor unit 140 measures a distance between the electronic device 100 and a user or an object. The sensor unit 140 may include at least part of the controller 170. For example, the sensor unit 140 may include an operation of obtaining information on an extent that a user or an object approaches the electronic device 100, and may also include an operation of correcting information on an extent that a user or an object approaches the electronic device 100, or an operation of producing a characteristic of information on an extent that a user or an object approaches the electronic device 100. In this case, the sensor unit 140 may be a functional module that has a hardware module and a software module. According to an embodiment of the present invention, if an incoming call is received, the electronic device 100 may automatically perform a call connection function when a user approaches within a specific distance to the electronic device 100.

The storage unit 150 includes at least one of an internal memory and an external memory.

The internal memory may include at least one of a volatile memory (e.g., Dynamic RAM (DRAM), Static RAM (SRAM), Synchronous Dynamic RAM (SDRAM), etc.), a non-volatile memory (e.g., One Time Programmable ROM (OTPROM), Programmable ROM (PROM), Erasable and Programmable ROM (EPROM), Electrically Erasable and Programmable ROM (EEPROM), Mask ROM, Flash ROM, etc.), a Hard Disk Drive (HDD), or Solid State Drives (SSD).

According to an embodiment of the present invention, the controller 170 loads and processes a command or data received from at least one of the non-volatile memory or other element into the volatile memory. Further, the control unit 170 stores the data received from or generated by the other elementin the non-volatile memory.

The external memory includes at least one of a Compact Flash (CF), a Secure Digital (SD), a Micro Secure Digital (Micro-SD), a Mini Secure Digital (Mini-SD), an extreme Digital (xD), and a Memory Stick.

The storage unit 150 stores an operating system that controls a resource of the electronic device 100 and an application program for operation of an application, and the like. The operating system may include a kernel, a middleware, API, or the like. For example, Android, iOS, Windows, Symbian, Tizen, or Bada may be used as the operating system.

The kernel may include a device driver and a system resource manager that can manage system resources. The resource manager may include, for example, a control management unit, a memory management unit, or a file system management, and the like, and performs a function of a control, an assignment or a recall of system resources. The device driver accesses and controls various elements of the electronic device 100 in view of software. To this end, the device driver may be divided into an interface and an individual driver module supplied by each hardware company. The device driver may include, for example, at least one of a display driver, a camera driver, a Bluetooth driver, a shared memory driver, a USB driver, a keypad driver, a Wi-Fi driver, an audio driver, or an Inter-Process Communication (IPC) driver.

The middleware may include a plurality of modules previously implemented to provide a commonly required function for various applications. The middleware may provide the commonly required function through an API so that a limited system resource within the electronic device may be efficiently used. The middleware may include, for example, at least one of an Application Manager, a Window Manager, a Multimedia Manager, a Resource Manager, a Power Manager, a Database Manager, and a package manager. In addition, according to various embodiments of the present invention, the middleware may include at least one of a Connectivity Manager, a Notification Manager, a Location Manager, a Graphic Manager, and a Security Manager. In addition, according to various embodiments of the present invention, the middleware may include a runtime library, or other library modules. The runtime library is a library module used by a compiler to add a new function through a programming language while the application program is executed. For example, the runtime library may perform a function related to an input and output, a memory management, or an arithmetic function, and the like. The middleware may generate a new middleware module through a combination of various functions of the above described internal element modules. Meanwhile, the middleware may provide a module specialized according to a type of operating system to provide a differentiated function.

The API is a set of API programming functions, and is provided with different configurations according to the operating system. For example, in the case of an Android or iOS operating system, for example, one API set is provided for each platform, whereas, in the case of Tizen, for example, two or more API sets are provided.

The application may perform at least one function by using an application program. The application may be a pre-loaded application or a third-party application.

The application may include, for example, a home application executing a home screen, a dialer application, a Short Message Server (SMS)/Multi-media Message Service (MMS) application, an Instant Message (IM) application, a browser application, a camera application, an alarm application, a contacts (or address book) application, a voice dial application, an E-mail application, a calendar application, a media player, an album application, and a watch application, or the like.

The audio unit 160 converts voice and electric signals bi-directionally. The audio unit 160 includes at least one of a speaker, a receiver, an earphone and a microphone to convert inputted or outputted voice information. According to an embodiment of the present invention, if an incoming call is received when the earphone is connected, the audio unit 160 may automatically perform a call connection function.

The control unit 170 operates an operating system and an application program to control a plurality of connected hardware and software elements and perform a processing and calculation of various data including multi-media data. The control unit 170 may be implemented by a System on Chip (SoC), and may further include a Graphic Processing Unit (GPU).

According to one embodiment of the present invention, the control unit 170 determines whether an application program is being executed when incoming call information is transmitted through the communication unit 130.

When an application program which occupies an entire or a part of a screen and is not currently being executed when the incoming call information is transmitted, the control unit 170 transmits to the display unit 110, a user interface for handling an incoming call. In this case, the user interface for handing an incoming call uses the whole surface of the screen or occupies part of the screen. The user interface for handling an incoming call using a whole surface or a part of the screen includes at least one of an incoming call permission user interface, an incoming call rejection user interface, an incoming call wait user interface, and a message handling user interface.

When the application program is currently being executed when the incoming call information is transmitted, the control unit 170 enables the display unit 110 to display the user interface for handling an incoming call using a screen boundary (e.g., a border or a side of the screen) to overlap the user interface of the executed application program. The overlapped user interface for handling an incoming call may be translucent so that the screen of the overlapped portion of the executed application program may be visible. The user interface for handling an incoming call using a screen boundary may include at least one of an incoming call permission user interface, an incoming call rejection user interface, an incoming call wait user interface, and a message handling user interface.

When a touch event is detected in the user interface for handling an incoming call using a screen boundary, the controller 170 performs a selected incoming call handling function, or enables the display unit 110 to display the user interface related to an incoming call handling. The touch event relates to a touch input by a user, and may include an operation of dragging an input means on a touch panel 121 by directly touching, an operation of flicking the input means on the touch panel 121 by directly touching, an operation of tapping the input means on the touch panel 121 by directly touching, an operation of dragging the input means such that the input means hovers over the touch panel 121, and an operation of flicking the input means such that the input means hovers over the touch panel 121, or the like. For example, when a user performs an operation of a long touch, or a drag on the user interface related to handling an incoming call, this operation is recognized as an operation of a call reception of user. According to another example, when a call is received while a user performs an operation (i.e., touch event), which is identical to a call reception operation, such as a long touch or a drag, with respect to an executed application program occupying the user screen, but the user unexpectedly performs the operation on the user interface for handling the incoming call, the control unit 170 determines the operation as a call reception operation only when the operation is performed after the user interface is displayed over a certain period of time.

Among the above operations, an operation which is not related to the handling of an incoming call is sent to an application program hidden by the incoming call handling screen to be used to operate the application program. For example, when user detaches his finger after touching an incoming call screen to push a button of an application program hidden by the incoming call handling screen, and, if this operation is not related to the handling of the incoming call, the operation may be recognized as a button pressing operation of the application program.

FIGS. 2 to 6 are flowcharts illustrating various methods for handling an incoming call of an electronic device, according to an embodiment of the present invention.

Figure 2:
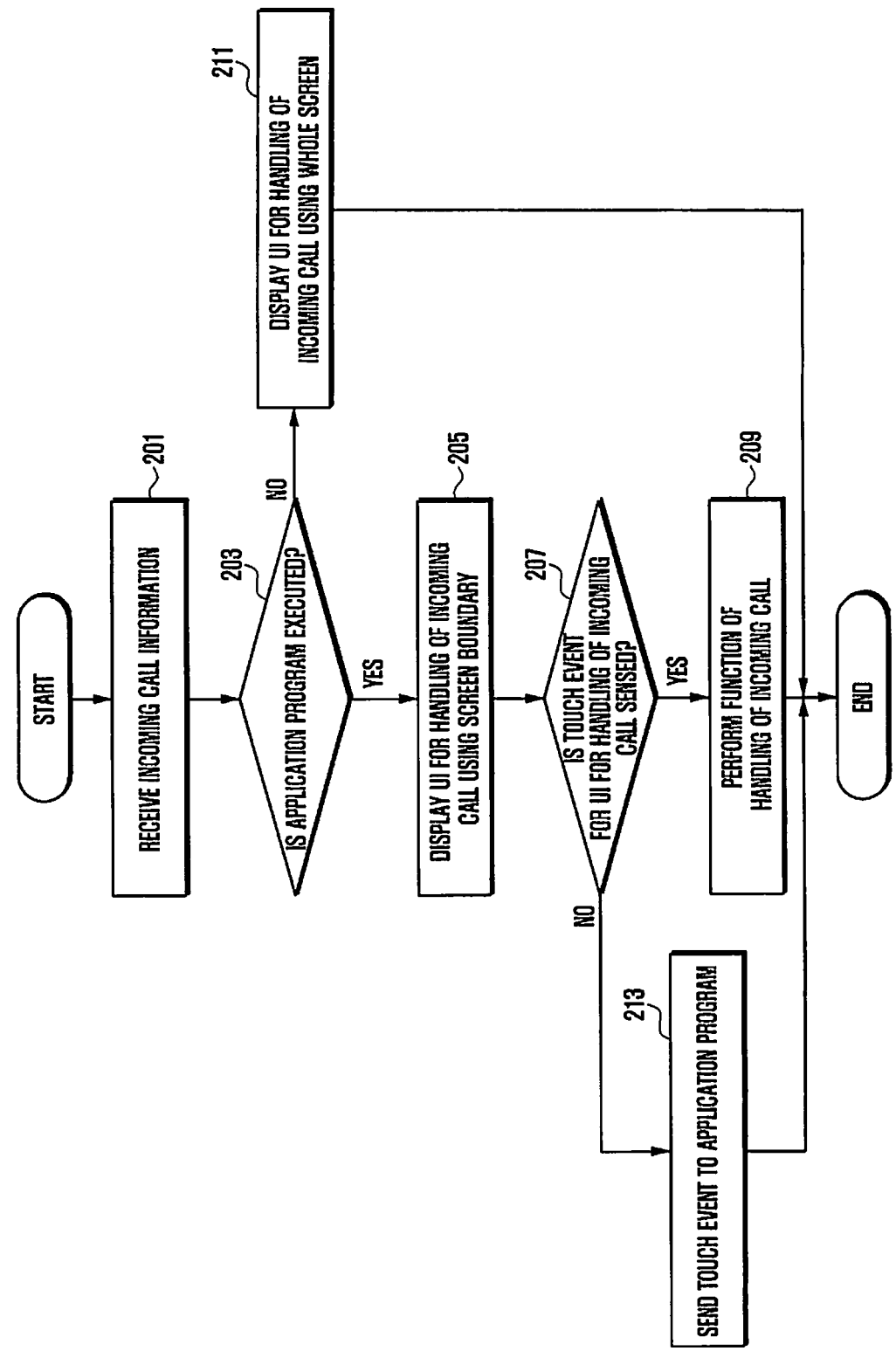
FIGS. 2 to 6 are flowcharts illustrating various methods for handling an incoming call of an electronic device, according to an embodiment of the present invention.

Referring to FIG. 2, at step 201, the electronic device 100 receives incoming call information through the communication unit 130. When the incoming call information is received, the electronic device 100 determines whether an application program is being executed, at step 203.

When an application program is being executed, the electronic device 100 enables the display unit 110 to display the user interface for handling an incoming call using a screen boundary to overlap the user interface of the executed application program, at step 205. When the user interface for handling an incoming call using a screen boundary is displayed to overlap the user interface of the executed application program, the user interface for handling an incoming call using a screen boundary is displayed using at least one of a translucent effect, a gradation effect, a blinking effect, and an animation effect.

The electronic device 100 may sense a touch event for the user interface for handling an incoming call using a screen boundary, at step 207. In this case, the electronic device 100 performs a function of handling an incoming call or displays the user interface for handling an incoming call on the display unit 110 in response to the sensed touch event, at step 209. The user interface for handling an incoming call using a screen boundary includes at least one of an incoming call permission user interface, an incoming call rejection user interface, an incoming call wait user interface, and a message handling user interface.

When a touch event is sensed on the user interface for handling an incoming call using the screen boundary, but is not a touch event for handling an incoming call, the electronic device 100 sends the touch event to the application program to operate the application program, at step 213.

When an application program is not being executed and incoming call information is received, the electronic device 100 displays the user interface for handling an incoming call using the whole surface of the screen on the display unit 110, at step 211. The user interface for handling of incoming call using the whole surface of the screen includes at least one of an incoming call permission user interface, an incoming call rejection user interface, an incoming call wait user interface, and a message handling user interface.

Figure 3:
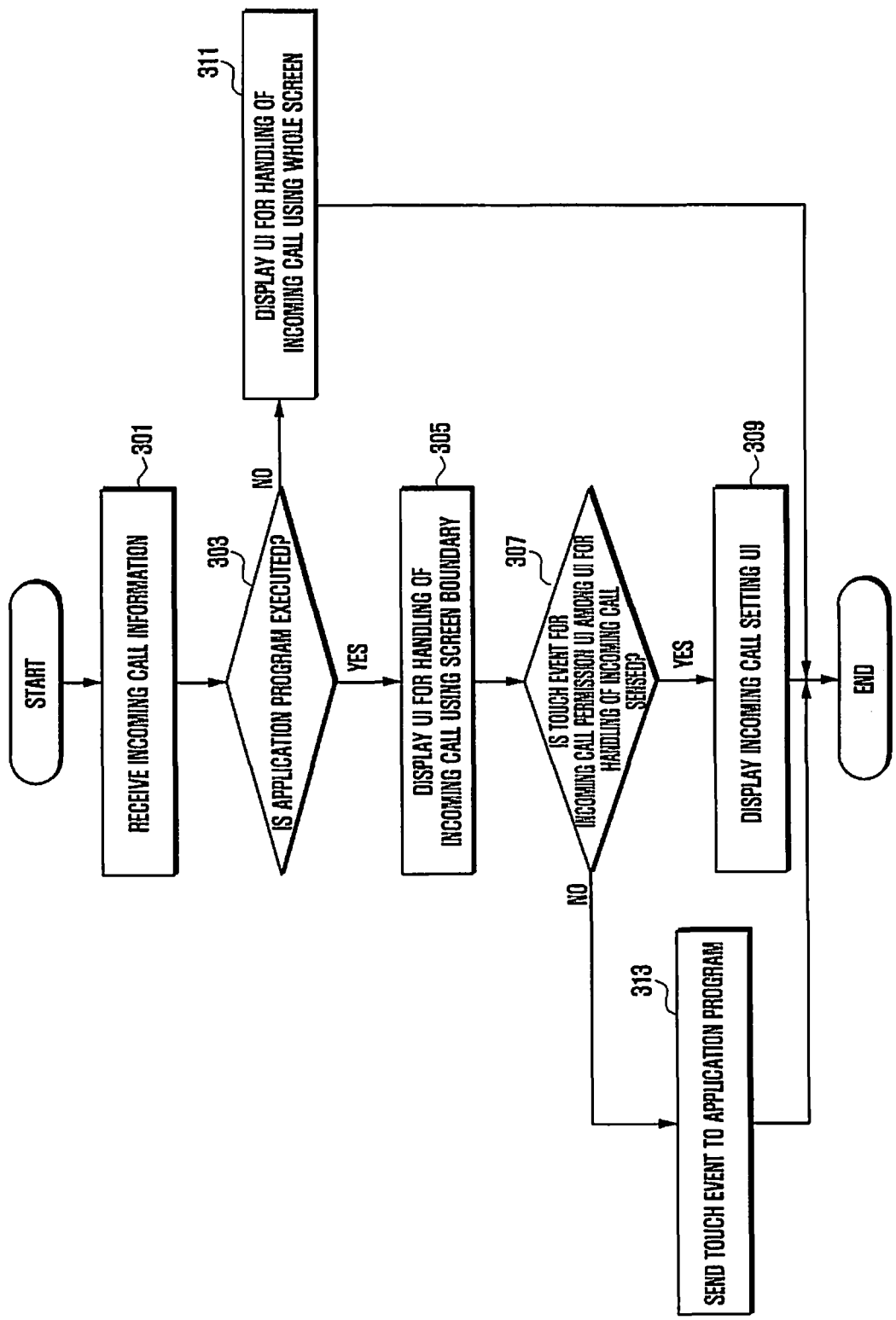

Referring to FIG. 3, a flowchart is provided illustrating a method for displaying an incoming call setting user interface when handling an incoming call using an incoming call permission user interface.

At step 301, the electronic device 100 receives incoming call information through the communication unit 130. When the incoming call information is received, the electronic device 100 determines whether an application program is being executed, at step 303.

When the application program is being executed, the electronic device 100 enables the display unit 110 to display the user interface for handling an incoming call using a screen boundary to overlap the user interface of the executed application program, at step 305. When the user interface for handling an incoming call using a screen boundary is displayed to overlap the executed application program, the user interface for handling an incoming call using a screen boundary is displayed using at least one of a translucent effect, a gradation effect, a blinking effect, and an animation effect. The user interface for handling an incoming call using a screen boundary include at least one of an incoming call permission user interface, an incoming call rejection user interface, an incoming call wait user interface, or a message handling user interface.

When the incoming call permission user interface is displayed and the electronic device 100 senses a touch event for the incoming call permission user interface, at step 307, the electronic device 100 displays an incoming call setting user interface on the display unit 110 to overlap the user interface of the executed application program in response to the sensed touch event, at step 309. For example, the incoming call setting user interface may be displayed to be translucently overlaid on the executed application program.

The incoming call setting user interface includes a user interface related to caller information and a user interface related to a call function. The user interface related to caller information includes at least one of a caller name and a caller phone number. The user interface for call function includes at least one of a user interface for a call recording function, a user interface for a dial input function, a user interface for a speaker phone function, a user interface for a call connection, a user interface for a call rejection, and a user interface for transmission of incoming call rejection message.

When a touch event is sensed on the user interface for handling an incoming call using the screen boundary, but is not a touch event for handling an incoming call, the electronic device 100 sends the touch event to the application program to operate the application program, at step 313. When a touch event occurs unexpectedly in the incoming call permission user interface when an application program is being executed, a user interface for a call connection, a user interface for a call rejection, or a user interface for transmission of an incoming call rejection message is displayed on the incoming call permission setting user interface, so that a malfunction of interrupting the application program is prevented.

When an application program is not being executed and incoming call information is received, the electronic device 100 displays the user interface for handling an incoming call using the whole surface of the screen on the display unit 110, at step 311. The user interface for handling an incoming call using the whole surface of the screen includes at least one of an incoming call permission user interface, an incoming call rejection user interface, an incoming call wait user interface, and a message handling user interface.

Figure 4:
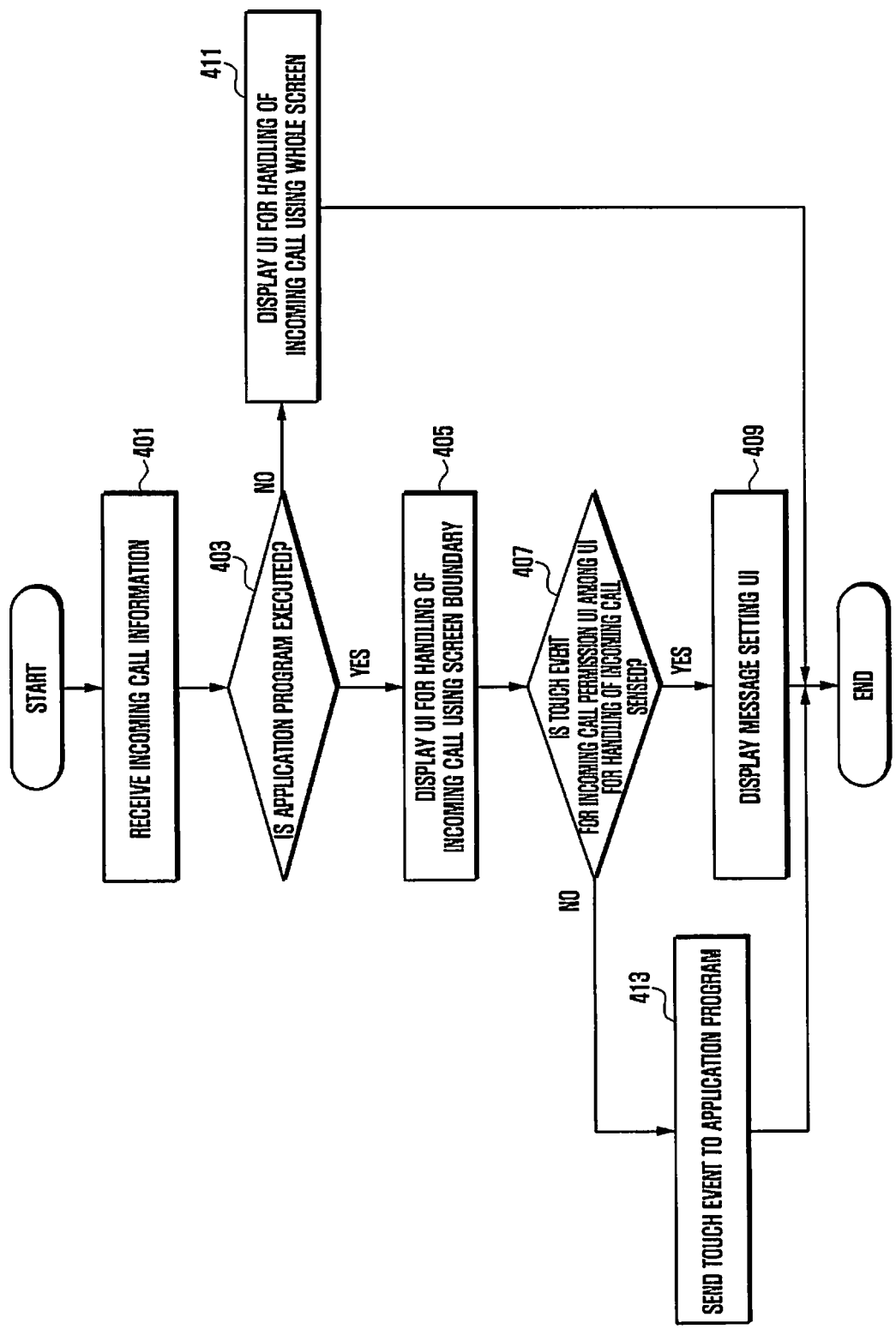

Referring to FIG. 4, a flowchart is provided illustrating a method for displaying a message setting user interface when handling an incoming call using an incoming call permission user interface.

At step 401, the electronic device 100 receives incoming call information through the communication unit 130. When the incoming call information is received, the electronic device 100 determines whether the application program is being executed, at step 403.

When the application program is being executed, the electronic device 100 enables the display unit 110 to display the user interface for handling an incoming call using a screen boundary to overlap the user interface of the executed application program, at step 405. When the user interface for handling an incoming call using a screen boundary is displayed to overlap the user interface of the executed application program, the user interface for handling an incoming call using a screen boundary is displayed using at least one of a translucent effect, a gradation effect, a blinking effect, and an animation effect. The user interface for handling an incoming call using a screen boundary includes at least one of an incoming call permission user interface, an incoming call rejection user interface, an incoming call wait user interface, or a message handling user interface.

When the incoming call permission user interface is displayed and the electronic device 100 senses a touch event for the incoming call permission user interface, at step 407, the electronic device 100 displays a message setting user interface on the display unit 110 to overlap the user interface of the executed application program in response to the sensed touch event, at step 409. For example, the message setting user interface may be displayed to be translucently overlaid on the executed application program. The message setting user interface includes an input field to transmit a message (e.g., Short Message Service (SMS), Multimedia Messaging Service (MMS), e-mail) to a sender, or a list of previously stored incoming call rejection message (e.g., a message including the reason for incoming call rejection such as "in meeting", "driving" or "working").

When the touch event is sensed on the user interface for handling an incoming call using the screen boundary, but is not a touch event for handling an incoming call, the electronic device 100 sends the touch event to the application program to operate the application program, at step 413.

When an application program is not being executed and incoming call information is received, the electronic device 100 displays the user interface for handling an incoming call using the whole surface of the screen on the display unit 110, at step 411. The user interface for handling an incoming call using the whole surface of the screen includes at least one of an incoming call permission user interface, an incoming call rejection user interface, an incoming call wait user interface, and a message handling user interface.

Figure 5:
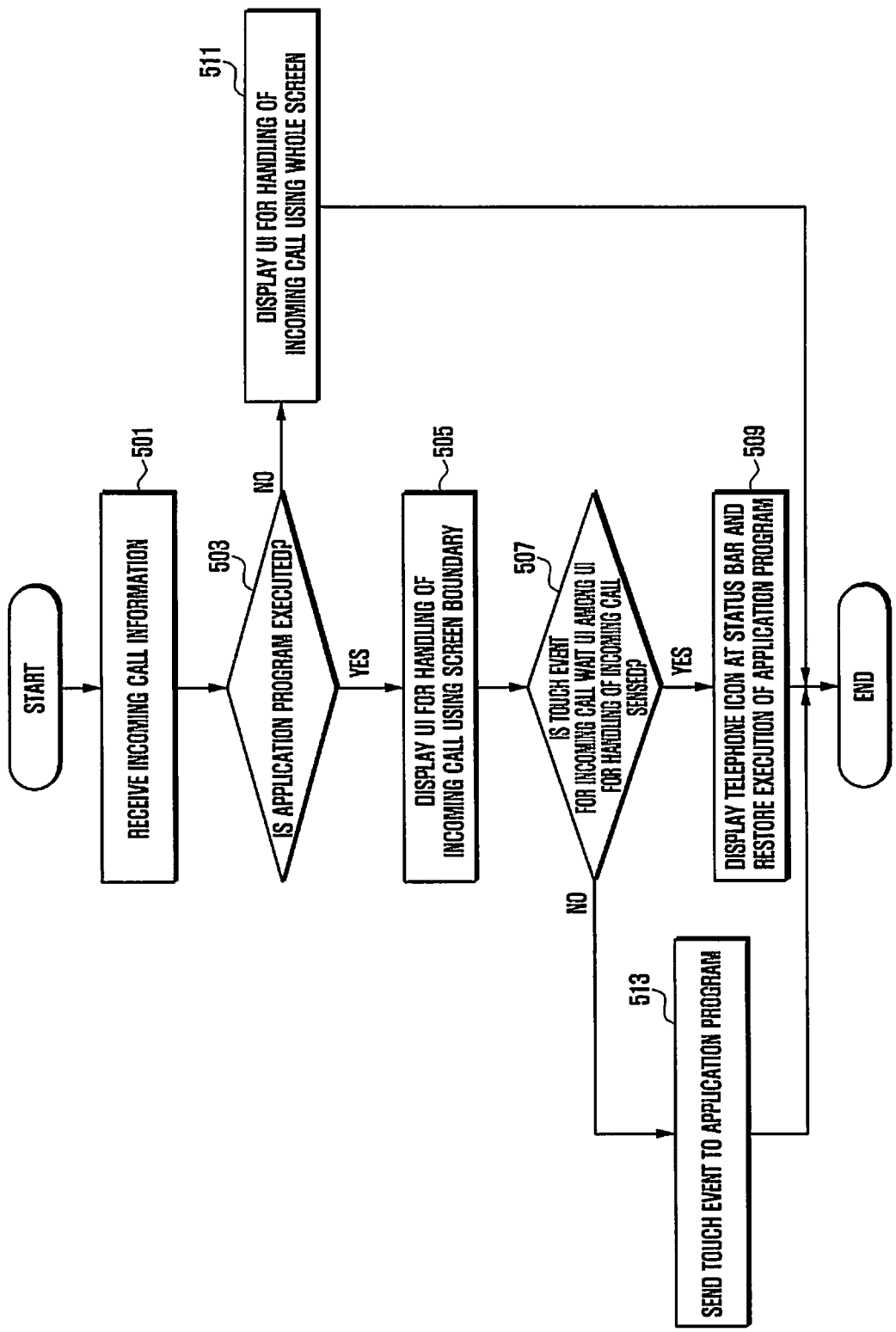

Referring to FIG. 5, a flowchart illustrating a method for handling an incoming call using an incoming call wait user interface is provided.

At step 501, the electronic device 100 receives incoming call information through the communication unit 130. When the incoming call information is received, the electronic device 100 determines whether the application program is being executed, at step 503.

When the application program is being executed, the electronic device 100 enables the display unit 110 to display the user interface for handling an incoming call using a screen boundary to overlap the user interface of the executed application program, at step 505. When the user interface for handling an incoming call using a screen boundary is displayed to overlap the user interface of the executed application program, the user interface for handling an incoming call using a screen boundary is displayed using at least one of a translucent effect, a gradation effect, a blinking effect, and an animation effect. The user interface for handling an incoming call using a screen boundary includes at least one of an incoming call permission user interface, an incoming call rejection user interface, an incoming call wait user interface, and a message handling user interface.

When the incoming call wait user interface is displayed and the electronic device 100 senses a touch event for the incoming call wait user interface, at step 507, the electronic device 100 displays, at step 509, a telephone icon indicating that the incoming call is received at a status bar without displaying the user interface for handling an incoming call using a screen boundary. Additionally at step 509, in response to the sensed touch event, the electronic device 100 restores the execution of the application program.

When the touch event is sensed for the user interface for handling an incoming call using the screen boundary, but is not a touch event for handling an incoming call, the electronic device 100 sends the touch event to the application program to operate the application program, at step 513.

When an application program is not being executed and incoming call information is received, the electronic device 100 displays the user interface for handling an incoming call using the whole surface of the screen on the display unit 110, at step 511. The user interface for handling an incoming call using the whole surface of the screen includes at least one of an incoming call permission user interface, an incoming call rejection user interface, an incoming call wait user interface, and a message handling user interface.

Figure 6:
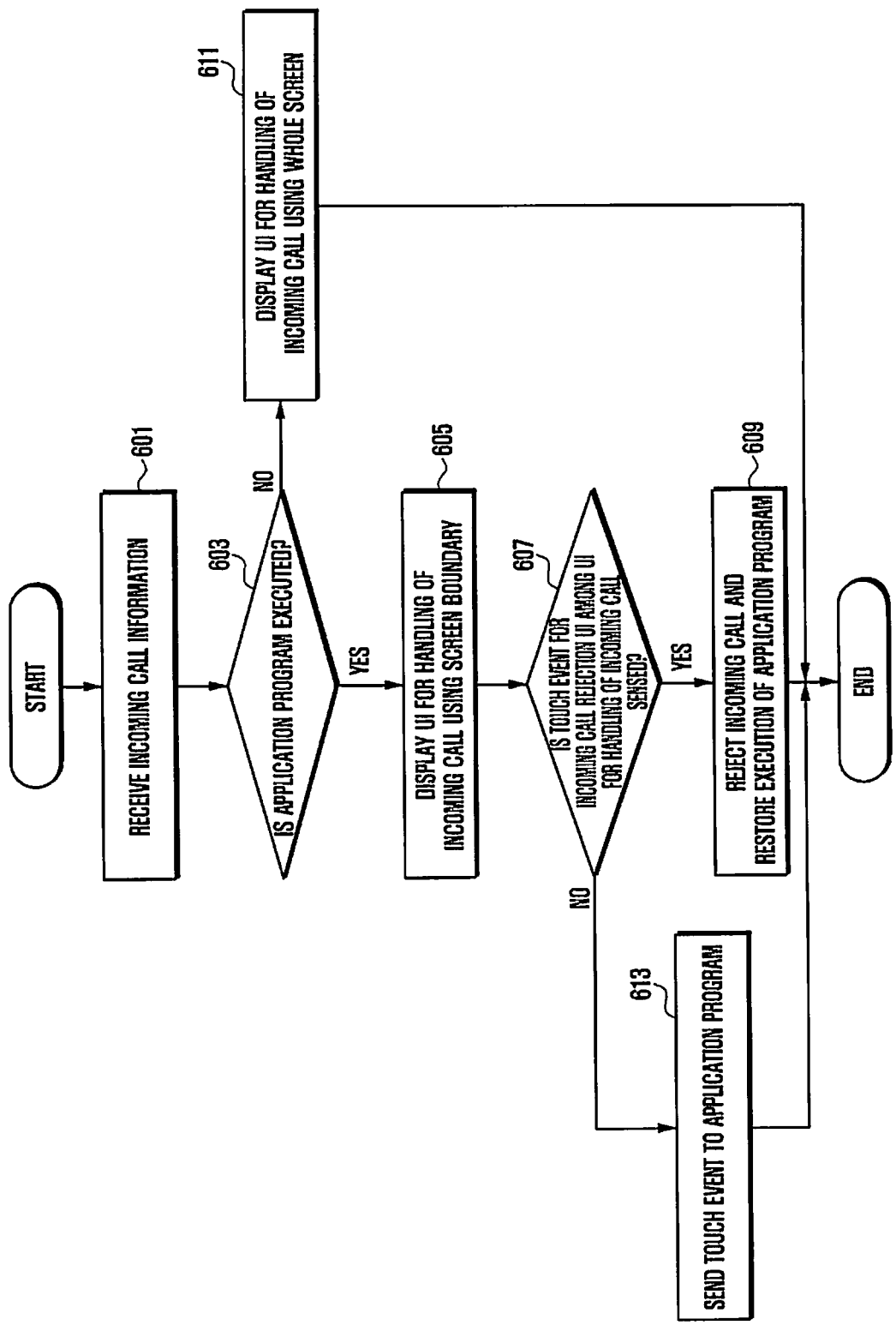

Referring to FIG. 6, a flowchart illustrating a method for handling an incoming call using an incoming call rejection user interface is provided.

At step 601, the electronic device 100 receives incoming call information through the communication unit 130. When the incoming call information is received, the electronic device 100 determines whether the application program is being executed, at step 603.

When the application program is being executed, the electronic device 100 enables the display unit 110 to display the user interface for handling an incoming call using a screen boundary to overlap the user interface of the executed application program, at step 605. When the user interface for handling an incoming call using a screen boundary is displayed to overlap the user interface of the executed application program, the user interface for handling an incoming call using a screen boundary is displayed using at least one of a translucent effect, a gradation effect, a blinking effect, and an animation effect. The user interface for handling an incoming call using a screen boundary includes at least one of an incoming call permission user interface, an incoming call rejection user interface, an incoming call wait user interface, and a message handling user interface.

When the incoming call rejection interface is displayed, and the electronic device 100 senses a touch event for the incoming call rejection user interface, at step 607, the electronic device 100 stops the display of the user interface for handling of incoming call using a screen boundary and rejects the incoming call, at step 609. Additionally at step 609, in response to the sensed touch event, the electronic device 100 restores the execution of the application program.

When the touch event is sensed for the user interface for handling an incoming call using the screen boundary, but is not a touch event for handling of an incoming call, the electronic device 100 sends the touch event to the application program to operate the application program, at step 613.

When an application program is not being executed and incoming call information is received, the electronic device 100 displays the user interface for handling an incoming call using the whole surface of the screen on the display unit 110, at step 611. The user interface for handling an incoming call using the whole surface of the screen includes at least one of an incoming call permission user interface, an incoming call rejection user interface, an incoming call wait user interface, and a message handling user interface.

FIGS. 7 to 13 are screens illustrating various methods for handling an incoming call of an electronic device, according to an embodiment of the present invention.

Figure 7:
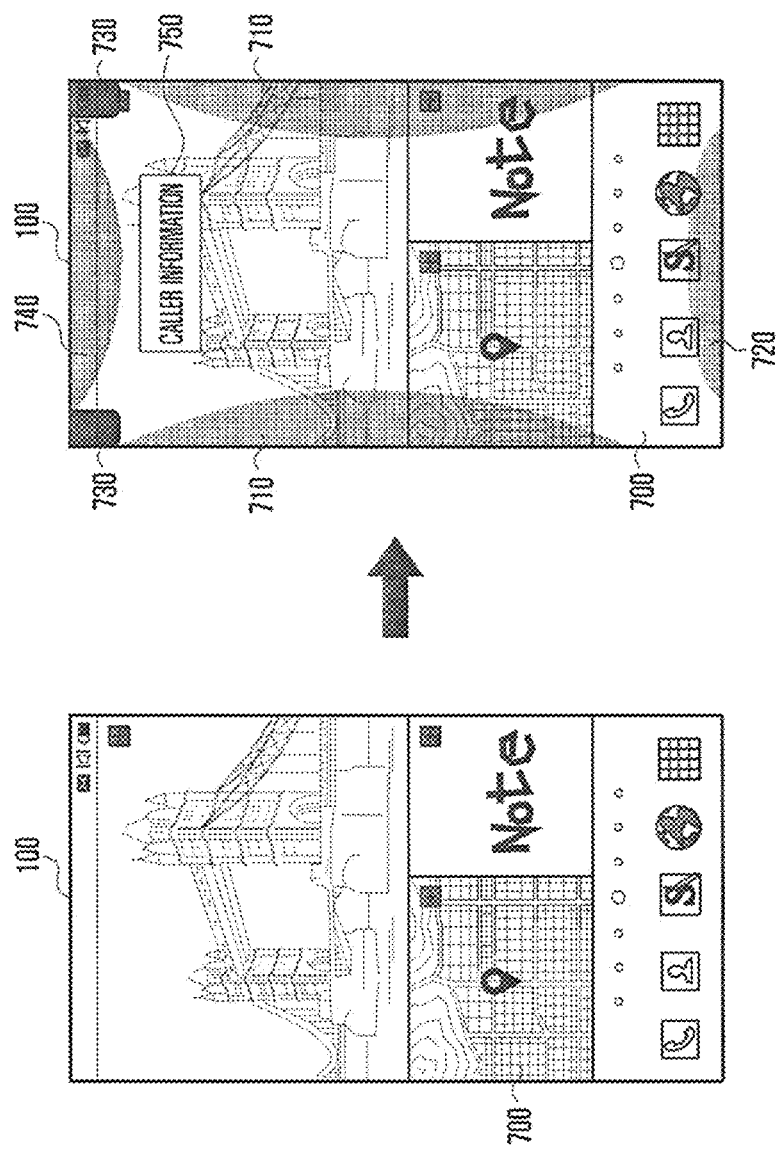
FIGS. 7 to 13 are screens illustrating various methods for handling an incoming call of an electronic device, according to an embodiment of the present invention.

Referring to FIG. 7, when incoming call information is received through the communication unit 130 while executing an application program 700, the electronic device 100 displays a user interface for handling an incoming call using a screen boundary to overlap the user interface of the executed application program 700. The user interface for handling an incoming call using a screen boundary includes at least one of an incoming call permission user interface 710, an incoming call rejection user interface 740, an incoming call wait user interface 730, and a message handling user interface 720. The user interface for handling an incoming call using a screen boundary may be displayed with various shapes, such as an icon shape, with an animation, or with an area of a specific shape, or may be a specific area on both sides of the upper and lower portions of the screen. When operating a center of the edge of the screen, such as with the incoming call permission user interface 710, the message handling user interface 720, and the incoming call rejection user interface 740, an area in which an icon shape, an animation, or a specific shape is positioned may exist in the center of the edge. A user may perform a long touch, or a drag on the above mentioned area to handle the incoming call, and an additional display area is generated to use an area shaped like an arc or a bar along the edge so that the user may recognize that incoming call handling is necessary. The user interface for handling an incoming call using a screen boundary may use a different color for each user interface. When the user interface for handling an incoming call using a screen boundary is displayed to overlap the user interface of the executed application program, the user interface for handling an incoming call using a screen boundary is displayed using at least one of a translucent effect, a gradation effect, a blinking effect, and an animation effect. Caller information 750 may be displayed horizontal or vertical to the boundary line, or may be displayed in the center of the screen. The caller information 750 may also be displayed by using the translucent effect, the blinking effect, or the animation effect. Here, the caller information 750 includes the caller's telephone number or the caller's name. The user interface for handling of incoming call may be displayed in a form suitable for a portrait view or a landscape view depending on a direction of the screen view of the electronic device 100, and may be rotated. That is, when an incoming call event occurs in a state in which the user uses the electronic device 100 in a portrait view, the user interface for handling an incoming call suitable for a portrait view is displayed, whereas the user interface for handling an incoming call may be rotated when the user rotates the electronic device 100 to change the screen into a landscape view.

Figure 8:
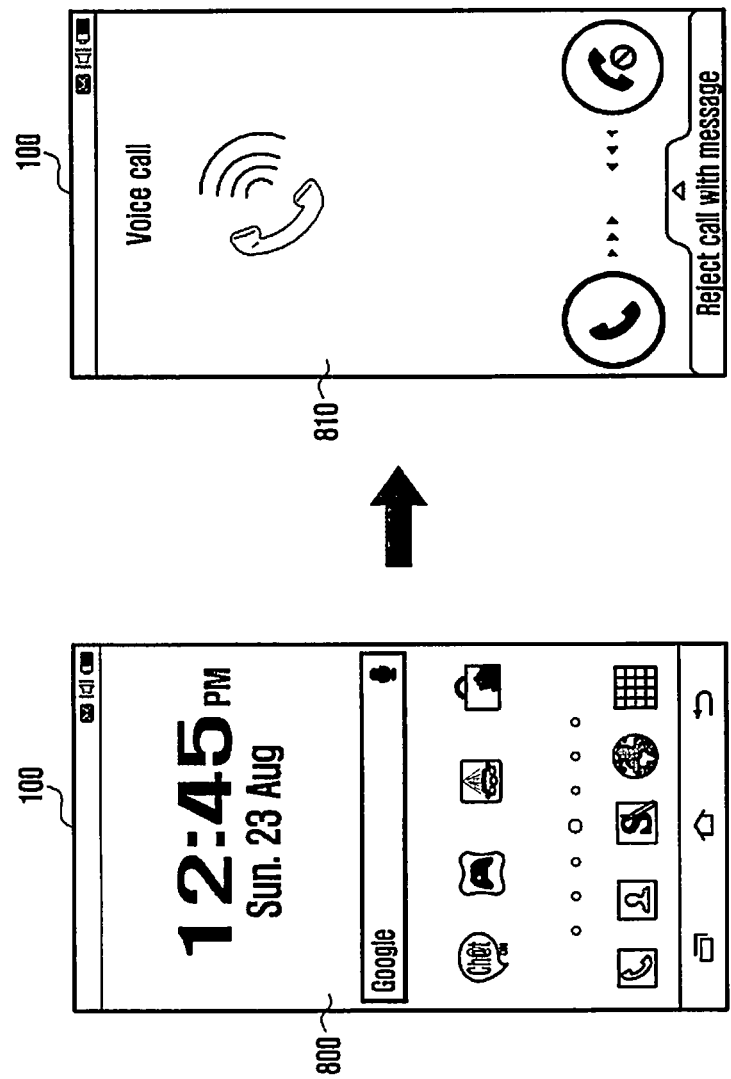
Figure 9:
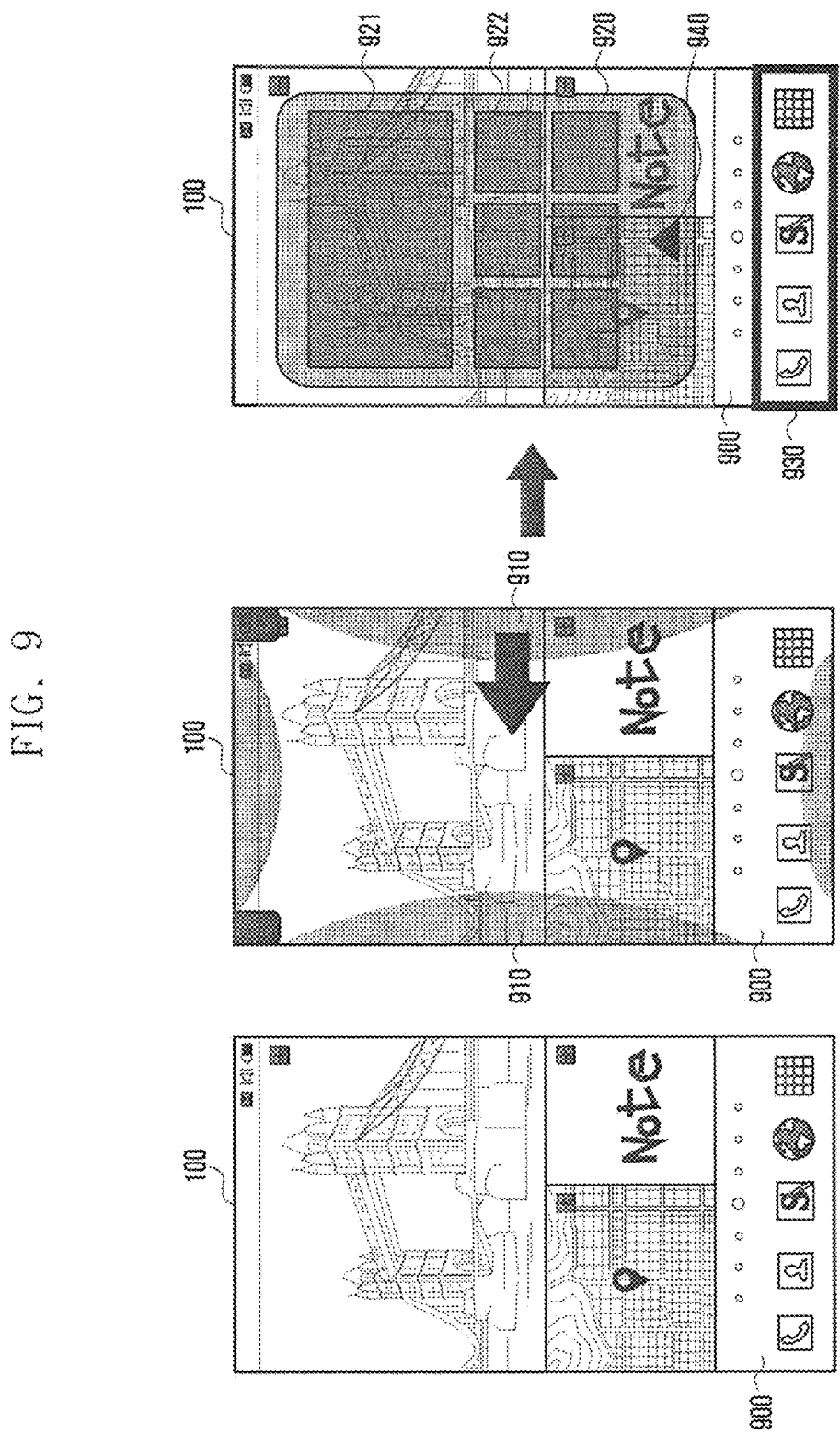

Referring to FIG. 8, when an application program is not executed as shown in reference numeral 800, the electronic device 100 displays a user interface 810 for handling an incoming call using the whole screen. The user interface 810 for handling an incoming call using a whole screen includes at least one of an incoming call permission user interface, an incoming call rejection user interface, an incoming call wait user interface, and a message handling user interface Referring to FIG. 9, when incoming call information is received through the communication unit 130 while executing an application program 900, the electronic device 100 displays the user interface for handling an incoming call using a screen boundary to overlap the user interface of the executed application program 900. When the user generates a touch event on the incoming call permission user interface 910, the electronic device 100 displays an incoming call setting user interface 920 to overlap the user interface of the executed application program 900. The incoming call setting user interface 920 is displayed to be translucently overlaid on the executed application program 900. The incoming call setting user interface 920 includes a user interface 921 related to caller information, and a user interface 922 related to a call function. The user interface 921 related to caller information includes at least one of a caller name and a caller phone number. The user interface 922 for a call function includes at least one of a user interface for a call recording function, a user interface for a dial input function, a user interface for a speaker phone function, a user interface for a call connection, a user interface for a call rejection, and a user interface for transmission of an incoming call rejection message.

The incoming call permission user interface 910 may be located on the left or the right edge of the screen, for convenience, depending on whether the user is right-handed or left-handed, or depending on a state in which the user holds the electronic device 100, the incoming call permission user interface 910 may be located on both edges of the screen. According to a user configured setting of the electronic device, the user may set only one edge to be enabled. The electronic device 100 may further add an animation such as an arrow shape 940 which induces an event, and an elongated bar 930, etc.

Figure 10:
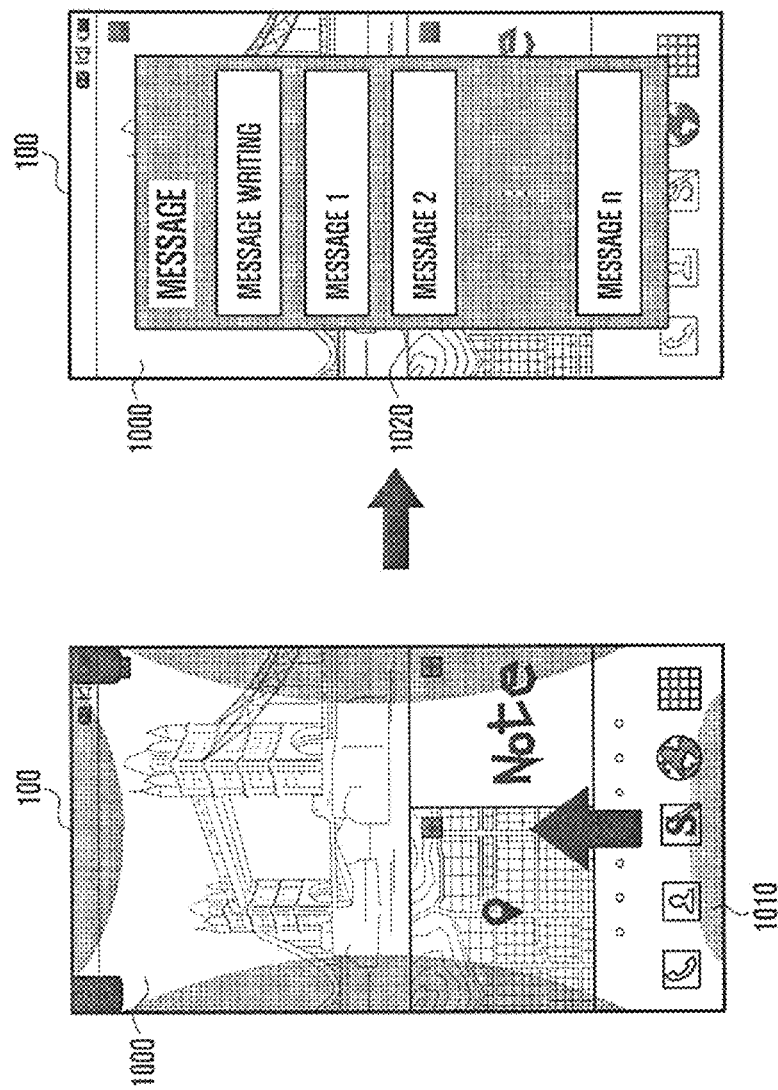

Referring to FIG. 10, when incoming call information is received through the communication unit 130 while executing an application program 1000, the electronic device 100 displays the user interface for handling of incoming call using a screen boundary to overlap the user interface of the executed application program 1000. When the user generates a touch event on a message handling user interface 1010, the electronic device 100 displays a message setting user interface 1020 to overlap the user interface of the executed application program 1000. The message setting user interface 1020 is displayed to be translucently overlaid on the executed application program 1000. The message setting user interface 1020 may include an input field to transmit a message (e.g., Short Message Service (SMS), Multimedia Messaging Service (MMS), e-mail) to a sender, or a list of previously stored incoming call rejection message (e.g., a message including the reason for incoming call rejection such as "in meeting", "driving" or "working").

Figure 11:
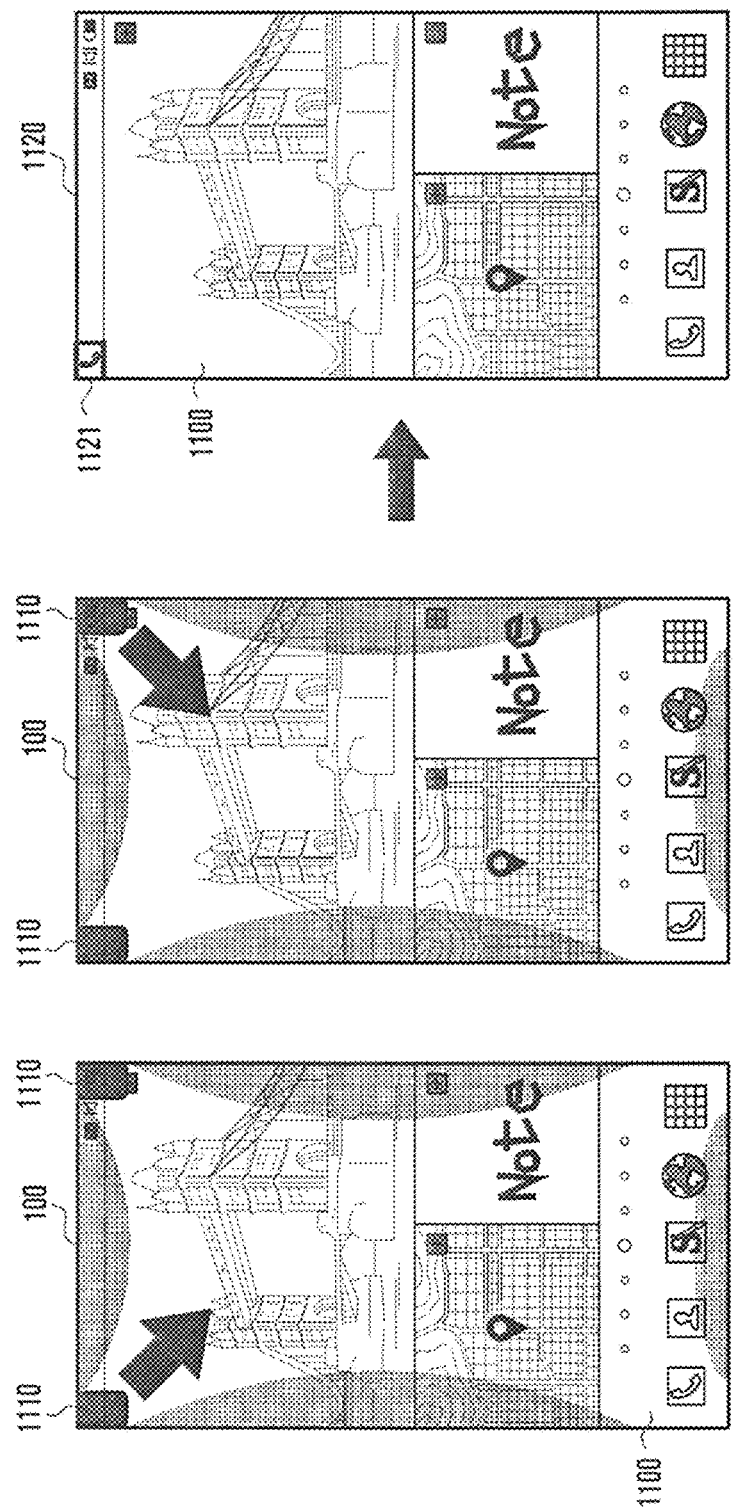

Referring to FIG. 11, when incoming call information is received through the communication unit 130 while executing an application program 1100, the electronic device 100 displays the user interface for handling of incoming call using a screen boundary to overlap the user interface of the executed application program 1100. When the user generates a touch event on an incoming call wait user interface 1010, the electronic device 100 displays, without displaying the user interface for handling an incoming call using a screen boundary, a telephone icon 1121 at a status bar 1120, indicating that the incoming call is received.

Figure 12:
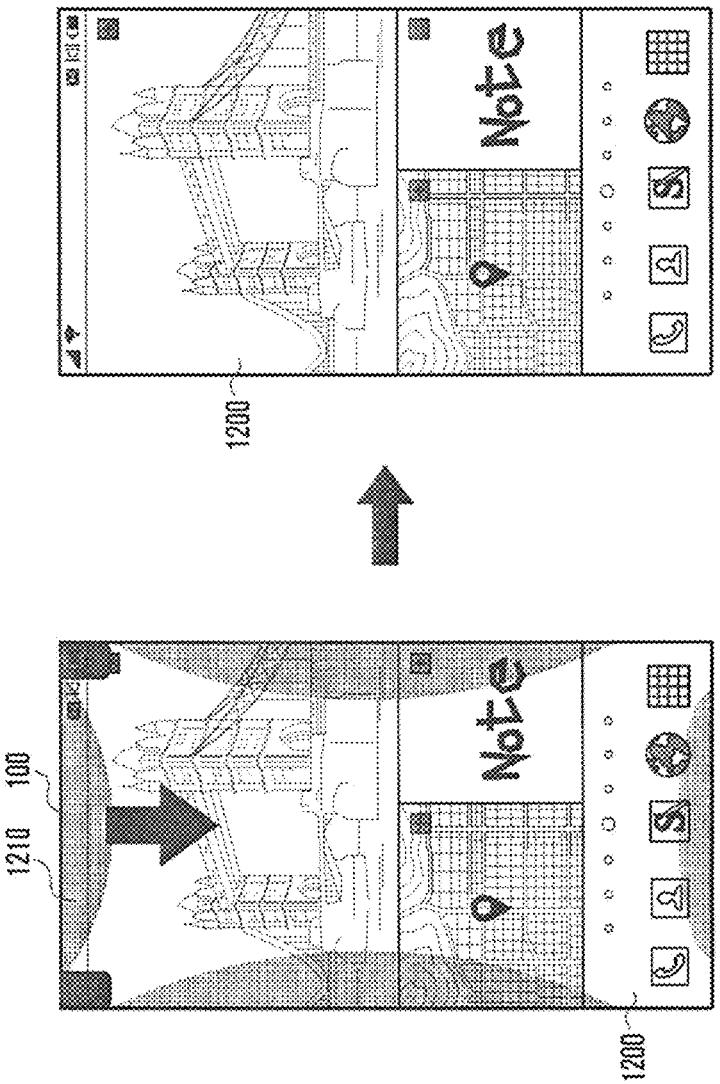

Referring to FIG. 12, when incoming call information is received through the communication unit 130 while executing an application program 1200, the electronic device 100 displays the user interface for handling an incoming call using a screen boundary to overlap the user interface of the executed application program 1200. When the user generates a touch event on an incoming call rejection user interface 1210, the electronic device 100 continues to display the executed application program without displaying the user interface for handling an incoming call using a screen boundary.

As shown in FIG. 12, the incoming call rejection user interface 1210 is located at the top of the screen, but the incoming call rejection user interface 1210 may be arranged at the bottom of the screen and the message handling user interface 1010 which was disposed at the bottom may be arranged at the top of the screen so that user may conveniently operate the incoming call permission and rejection.

Figure 13:
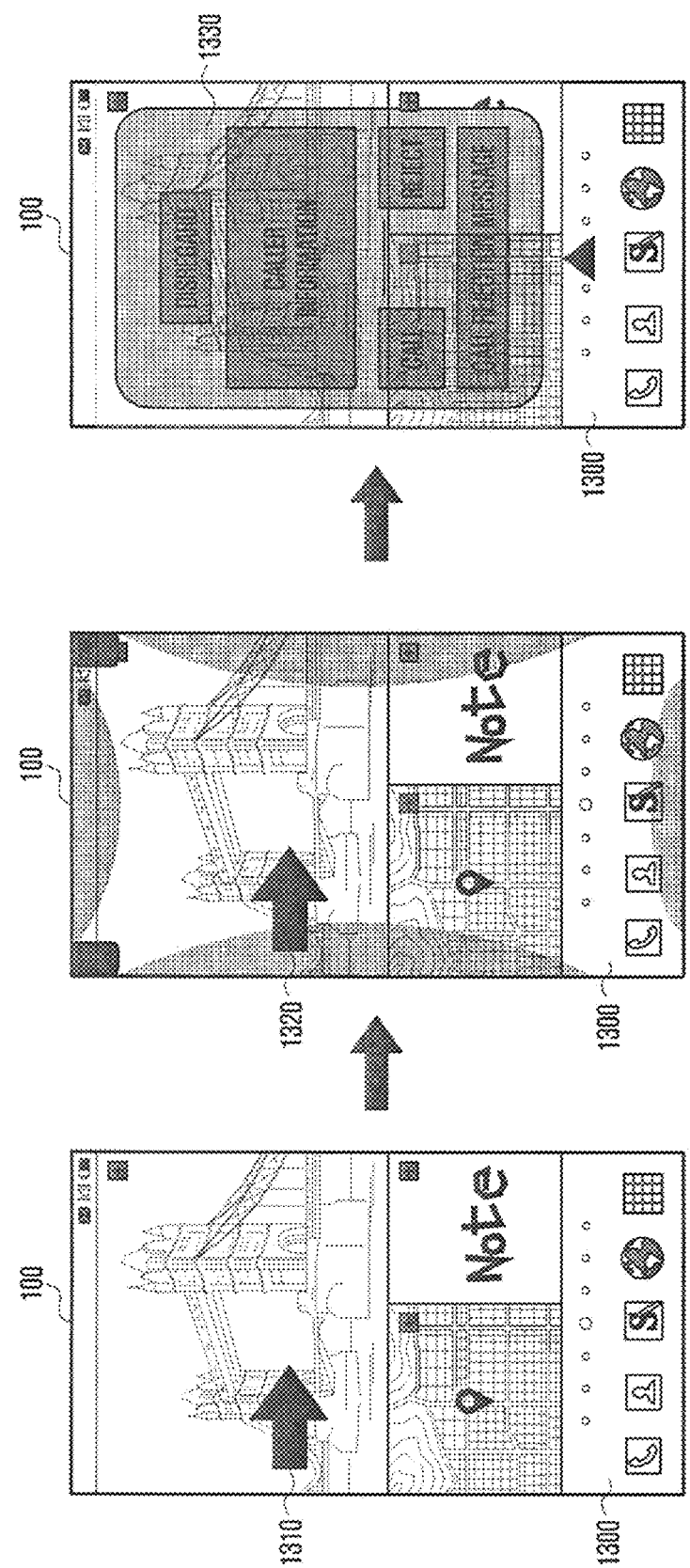

Referring to FIG. 13, a user may perform an operation (i.e., a touch event), with respect to an executed application program as shown in 1310, which is identical to an operation for handling an incoming call, e.g., such as a long touch or a drag. When such touch event occurs in the user interface for handling an incoming call, the electronic device 100 determines whether the user interface is displayed for a certain period of time. When the user performs the touch event on the user interface for handling an incoming call 1320 after the user interface is displayed for a certain period of time, the touch event sis recognized as an intentional operation by the user, so that an operation of handling an incoming call is performed. When the user performs the touch event on the user interface for handling an incoming call 1320 before the user interface is displayed for a certain period of time, the touch event is recognized as an unexpected or unintended operation by the user, so that incoming call handling information 1330 is displayed. The incoming call handling information 1330 include at least one of caller information, an incoming call permission user interface, an incoming call rejection user interface, an incoming call wait user interface, or a message handling user interface.

According to one embodiment of the invention an electronic device and a method is provided for processing an incoming call while minimizing interruption of a currently running application program, thereby increasing a user's convenience.

Although embodiments of the present invention have been described in detail hereinabove, it should be clearly understood that many variations and modifications of the basic invention taught herein, which may be obvious to those skilled in the art, will still fall within the spirit and scope of the present invention, as defined in the appended claims.

What is claimed is:

1. A method for handling an incoming call of an electronic device, the method comprising:
    displaying a user interface for handling the incoming call using a screen boundary of the electronic device, when receiving incoming call information while executing an application program on the electronic device;
    sensing a touch event on the user interface for handling the incoming call using the screen boundary; and
    performing an incoming call handling function based on the sensed touch event,
    wherein the user interface for handling the incoming call using the screen boundary is displayed to overlap the user interface of the executed application program, and includes at least one of an incoming call permission user interface, an incoming call rejection user interface, an incoming call wait user interface, and a message handling user interface, and
    wherein the user interface is displayed on a plurality of screen boundaries when a plurality of user interfaces are displayed.

2. The method of claim 1, further comprising displaying the user interface for handling the incoming call using a whole screen or a partial area of the electronic device, when receiving the incoming call information and the application program is not executed.

3. The method of claim 1, wherein the user interface for handling the incoming call using a screen boundary is displayed using at least one of a translucent effect, a gradation effect, a blinking effect, and an animation effect.

4. The method of claim 1, wherein the incoming call permission user interface, the incoming call rejection user interface, the incoming call wait user interface, and the message handling user interface are displayed with a different color or a different combination of colors.

5. The method of claim 1, wherein performing the incoming call handling function based on the sensed touch event comprises performing at least one of:
    displaying an incoming call setting user interface,
    displaying a message setting user interface,
    stopping a display of the user interface for handling the incoming call, and
    stopping a display of the user interface for handling the incoming call to display a telephone icon in a status bar.

6. The method of claim 1, further comprising transmitting the touch event to the application program, when the touch event on the user interface for handling the incoming call using the screen boundary is not a touch event for handling the incoming call.

7. The method of claim 1, wherein sensing the touch event on the user interface for handling the incoming call using the screen boundary comprises:
    determining whether the touch event is generated on the user interface for handling the incoming call after the user interface for handling the incoming call is displayed for a certain period of time, and
    handling the incoming call based on the touch event, when the touch event is generated after the certain period of time.

8. The method of claim 7, wherein sensing the touch event on the user interface for handling the incoming call using the screen boundary further comprises
    displaying incoming call handling information, when the touch event is generated before the certain period of time.

9. The method of claim 8, wherein the incoming call handling information includes at least one of caller information, an incoming call permission user interface, an incoming call rejection user interface, an incoming call wait user interface, and a message handling user interface.

10. An electronic device comprising:
    a communication unit configured to receive incoming call information;
    a user input unit configured to sense a touch event;
    a display unit configured to display an application program and a user interface for handling an incoming call; and
    a controller configured to control the display unit to display the user interface for handling the incoming call using a screen boundary of the electronic device, when receiving the incoming call information while executing the application program, and to perform an incoming call handling function based on the sensed touch event,
    wherein the user interface for handling the incoming call using the screen boundary is displayed to overlap the user interface of the executed application program, and includes at least one of an incoming call permission user interface, an incoming call rejection user interface, an incoming call wait user interface, and a message handling user interface, and
    wherein the user interface is displayed on a plurality of screen boundaries when a plurality of user interfaces are displayed.

11. The electronic device of claim 10, wherein the controller is further configured to control to display the user interface for handling of the incoming call using a whole screen or a partial area of the electronic device, when receiving the incoming call information and the application program is not executed.

12. The electronic device of claim 10, wherein the user interface for handling the incoming call using a screen boundary is displayed using at least one of a translucent effect, a gradation effect, a blinking effect, and an animation effect.

13. The electronic device of claim 10, wherein the incoming call permission user interface, the incoming call rejection user interface, the incoming call wait user interface, and the message handling user interface are displayed with a different color or a different combination of colors.

14. The electronic device of claim 10, wherein performing the incoming call handling function based on the sensed touched event comprises performing at least one of: displaying an incoming call setting user interface, displaying a message setting user interface, stopping a display of the user interface for handling the incoming call, and stopping a display of the user interface for handling the incoming call to display a telephone icon in a status bar.

15. The electronic device of claim 10, wherein the controller is further configured to transmit the touch event to the application program, when the touch event on the user interface for handling the incoming call is not a touch event for handling the incoming call.

16. The electronic device of claim 10, wherein when sensing of the touch event on the user interface for handling the incoming call using the screen boundary the controller is configured to:
  determine whether the touch event is generated on the user interface for handling the incoming call after the user interface for handling the incoming call is displayed for a certain period of time, and
  handle the incoming call based on the touch event, when the touch event is generated after the certain period of time.

17. The electronic device of claim 16, wherein when sensing the touch event on the user interface for handing the incoming call using the screen boundary and the touch event is generated before the certain period of time, the controller is further configured to display incoming call handling information.

18. The electronic device of claim 17, wherein the incoming call handling information includes at least one of caller information, an incoming call permission user interface, an incoming call rejection user interface, an incoming call wait user interface, and a message handling user interface.

* * * * *